June 10, 1969   HIROSUKE YUMOTO ET AL   3,449,196
APPARATUS FOR MAKING BAGLIKE BODIES OF
THERMOPLASTIC SYNTHETIC RESIN FILMS
Filed April 20, 1964   Sheet 1 of 4
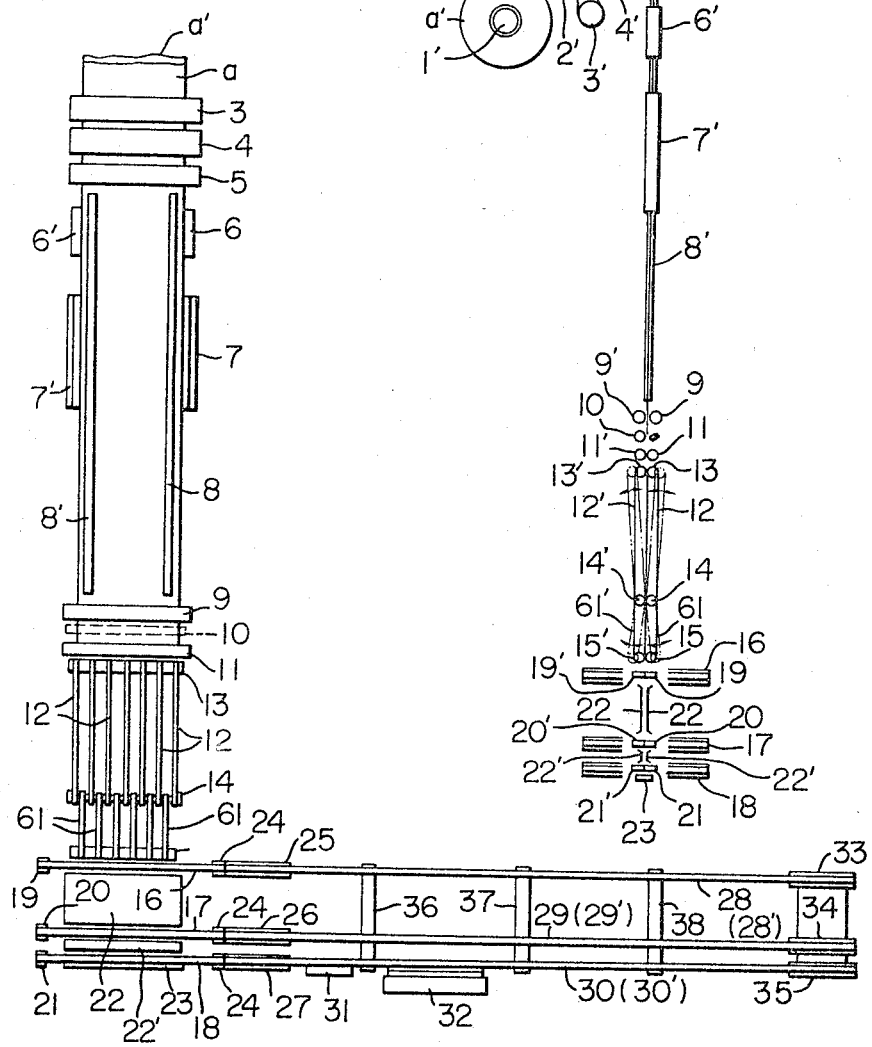
INVENTORS
H. YUMOTO   S. KIRIMURA
T. HASHIMOTO   M. KONO
Y. MORITA   Y. KOJIMA
Y. SHIBATA
BY Wenderoth, Lind and Ponack
ATTORNEYS H. YUMOTO
T. HASHIMOTO
Y. MORITA
Y. SHIBATA
S. KIRIMURA
M. KONO
Y. KOJIMA    INVENTORS BY Wenderoth, Lind & Ponack
ATTORNEYS

United States Patent Office 3,449,196
Patented June 10, 1969

3,449,196
APPARATUS FOR MAKING BAGLIKE BODIES OF THERMOPLASTIC SYNTHETIC RESIN FILMS
Hirosuke Yumoto, Takeshi Hashimoto, and Yutaka Morita, Mishima-shi, Shizuoka-ken, and Yoshinobu Shibata, Sunto-gun, Shizuoka-ken, and Shunichiro Kirimura and Mototsugu Kono, Mishima-shi, Shizuoka-ken, and Yasuhiro Kojima, Bunkyo-ku, Tokyo, Japan, assignors to Toyo Rayon Kabushiki Kaisha, Tokyo, Japan
Filed Apr. 20, 1964, Ser. No. 361,164
Claims priority, application Japan, Aug. 8, 1963, 38/41,889; Sept. 25, 1963, 38/70,493; Sept. 28, 1963, 38/51,623
Int. Cl. B32b 31/20; B29d 23/00
U.S. Cl. 156—498                      3 Claims

---

ABSTRACT OF THE DISCLOSURE

An apparatus for making baglike bodies of thermoplastic synthetic resin films by heat-sealing two or more sheets of said films, the apparatus including a tube-making means consisting of at least one guide roll, take-up rolls spaced from the guide roll, a pair of cooling means disposed between the guide roll and the take-up rolls along the advancing direction of the films and just slightly inwardly of the location of the side edges of the films to be sealed, said cooling means having a gap through which the films are slidable, heating means disposed on both sides of the path of the films adjacent the film edges and along which the film edges protrude externally of said cooling means are adapted to slide, a further cooling means disposed next following each said heating means in the direction in which the films move and against which the film edges are adapted to slide; the combination further comprising a severing means for cutting the thermoplastic synthetic resin film tube whose edges have been completely fused together by said tube-making means, in predetermined lengths at right angles to the advancing direction of the film tube; and a bag bottom sealing means having heating means for fusing together the severed edge of the film tube.

---

This invention relates to an apparatus for making baglike bodies of thermoplastic synthetic resin films, which performs commercially to advantage the heat-sealing operation in an excellent manner such that there is no possibility for the occurrence of pinholes and in which the seal strength obtained shows a marked improvement over that obtained by the prior art process. More particularly, it relates to an apparatus which can make commercially to advantage a baglike body in which in heat sealing thermoplastic synthetic resin films, and particularly advantageously thermoplastic synthetic resin films having relatively great heat shrinkage, preferably by the continuous method, the edges of said films are heated from the outside along the edge to be sealed until the whole of the edges inclusive of the sides of the edges are fused, while restraining the shrinkage of the films so that at least there is substantially no shrinkage in the direction of the seal, said heating being carried out in such a manner that in the meantime the film is cooled along the direction of the seal in the vicinity of said edges on that side opposite to the side being heated relatively of the aforesaid edges being fused, and preferably that the film is also cooled from the side edges of the film after having passed through the heating zone, whereby a baglike body is obtained in which the heat-sealing thereof has been accomplished in such a manner that the heat-sealed portions of the two sides and bottom of said structure are fused inclusive of the sides of the film edges so as to exhibit a beaded state.

More specifically, the invention concerns an apparatus for making baglike bodies by heat sealing two or more thermoplastic synthetic resin films, said apparatus comprising a tube-making means consisting of a pair of cooling means disposed between the guide roll and take-up rolls along the advancing direction of the films in the vicinity of the edges at the two sides thereof to be sealed and having gaps therein for cooling the films by the slidable movement of said films therethrough, heating means disposed in proximity of the film edges which protrude externally of said cooling means, and preferably another cooling means disposed next following said heating means and on the same side as said heating means relatively of the film edges; a severing means for cutting the thermoplastic synthetic resin film tube whose edges have been completely fused together by the foregoing tube-making means, in predetermined lengths at right angles to the advancing direction of the film tube; and a bag bottom sealing means having heating means for fusing together the severed edge of the film tube; the apparatus particularly preferred being that in which the heating means has a groove for the passage of the film edges and further is disposed obliquely with respect to the advancing direction of the film so as to insure that said film edges travel through said grooves.

In the past, various method have been proposed for sealing thermoplastic synthetic resin films, such as the heat conduction method (so-called heat-sealing), the high frequency method, the momentary current method (so-called impulse sealing) and the heat fusion method.

However, by means of the prior art methods in which heat was applied from the outside the union was effected by the films to be united being fused up to the vicinity of the surfaces to be united, but the union of the films such that at the site of joining the whole of the films thickness in a completely fused state was avoided. The reason for this was that in the heat-sealing method in which the heat was applied from the outside to other than the remote edge of the films the temperature reached was highest at its outermost surface and lowest at the surface to be united. Hence, for obtaining a sufficient seal strength at the surface to be united, the outer layers were over-heated thus to degrade the film itself. On the other hand, when attempts were made to avoid such degradation of the film, this frequently became the causes of imperfect sealing in the foregoing prior art methods. Further, nonuniform heat shrinkage would occur in the films to become the cause for pinholes to occur, and in extreme cases technical difficulties would be brought about so that the object of heat-sealing would be lost completely. Furthermore, in the case of a thermoplastic synthetic resin film having great heat shrinkage, say, stretched polypropylene film, not only would there develop in the vicinity of the sealed portion difficult-to-avoid wrinkles but the technical difficulties such as mentioned above would be aggravated as well.

As a result of our researches for an apparatus which would essentially overcome these difficulties and provide a heat-seal having markedly improved seal strength and which could be used commercially with great ease and to particular advantage, we found that the portion to be sealed should be completely fused and that the sealing should be effected at the edges of the films to be joined. Further, it was found that in fusing these edges the shrinkage of the films should be restrained such that at least substantially no shrinkage occurs in the direction of the seal, that the heating should be applied externally of the edges to be sealed and that in this instance that the heating should be applied while cooling the film along the direction of the seal in the vicinity of the edges at that side opposite to which the heating is applied. It was also found that it was particularly desirable that the heating means be provided with a groove for the passage of the films edges therethrough and that the heating means be disposed obliquely with respect to the advancing direction of the films and in contact therewith to ensure that the edges of said films travel through said groove.

Further, we found, as described hereinafter with reference to the drawings, that the sectional configuration of the perfectly fused-together portion of these edges had a bearing on the seal strength, and that according to the invention apparatus, the stress with respect to pulling and tearing was dispersed favorably without local accumulation in the united portion and this together with the strength ascribable to the completely fused union made it possible to obtain a heat-seal of sectional configuration having a very remarkable seal strength.

In addition, it was found that besides the cooling of the films which was carried out along the direction of the seal in the vicinity of the edges on that side opposite to the side being heated relatively of said edges being fused, it was desirable that cooling be similarly carried out at the side at which the films are heated and fused, at a point subsequent to the heating zone.

The heat-sealed portion of the baglike bodies obtained by means of the apparatus of the present invention is fused together in such a manner that the two sides and bottom of the bag, inclusive of the sides of film edges, are in beaded state.

Accordingly, an object of the present invention is to provide, in making baglike bodies by heat-sealing thermoplastic synthetic resin films, particularly films having great heat shrinkage, an apparatus which can make commercially with ease beautifully finished heat-sealed baglike bodies which have been heat-sealed in a beaded state as hereinbefore described, and which, when compared with the prior art methods, provides markedly improved seal strength without the possibilities of development of wrinkles or pinholes and heat degradation of the sealed portion.

Another object of the invention is to make known modified embodiments of such an apparatus and hence provide an apparatus for making baglike bodies of thermoplastic synthetic resin film commercially to advantage.

Other objects and advantages of the present invention will be apparent from the following description.

The invention apparatus is conveniently employed for heat-sealing thermoplastic synthetic resin films, and particularly the heat-shrinkable films. The term "heat-shrinkable films," as used herein, is a generic term applied to those films in which substantial shrinkage occurs under conditions of heat, irrespective of whether they are stretched or unstretched films. As such films, included are, for example, the stretched and unstretched films of polyethylene, polypropylene, polyvinyl chloride, polyamides, polyesters and other thermoplastic resins. The polypropylene film whose heat shrinkage is great is utilized to particular advantage for making baglike bodies. For example, although 25–50 micron biaxially stretched polypropylene which has been stretched 20–30 times already shrinks almost to about 60% of its original dimensions, the invention apparatus can be employed to advantage even with such a film.

Hereinafter, the invention apparatus will be described concretely with reference to the accompanying drawings. It is to be understood that the invention apparatus is not to be limited to the following embodiments, but to include all obvious variations and modifications in design within the spirt and scope of the appended claims.

FIG. 1 is a side elevation as seen from the side of the tube-making means, illustrating a preferred embodiment of this invention;

FIG. 2 is a top plan view thereof;

Figure 3:
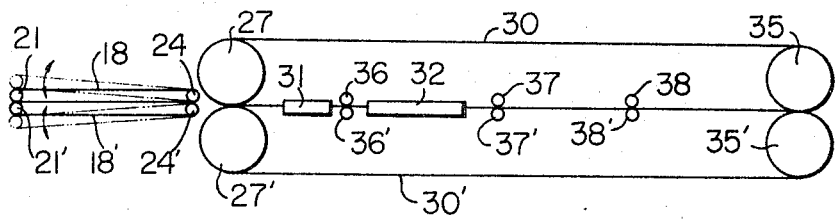
FIG. 3 is a side elevation as seen from the side of the bag bottom sealing means of FIG. 2.

First of all, for taking two or more thermoplastic synthetic resin films to be united by heat-sealing and to fashion them into a tubular shape, the apparatus of this invention has a tube-making means so designed to heat the edges of said films from the outside along the edge to be sealed until the whole of the edges on the two sides of the film inclusive of sides of edges are fused, while restraining the shrinkage of the films so that at least there is substantially no shrinkage in the direction of the seal, and such that said heating can be carried out in such a manner that in the meantime the film is cooled along the direction of the seal at least in the vicinity of said edges on that side opposite to the side being heated relatively of the aforesaid edges being fused. Namely, in the apparatus shown in FIGS. 1–3, there is shown a tube-making means comprising a pair of cooling means 8, 8 and 8', 8' disposed between the guide roll 5 and take-up rolls 9, 9' along the advancing direction of the films in the vicinity of the edges at the two sides thereof to be sealed and having gaps therein for cooling said film while it is slidably moving along in its advancing direction, heating means 6, 6' disposed in proximity to the film edges which protrude externally of said cooling means, and preferably another cooling means 7, 7' disposed following said heating means and on the same side as said heating means relatively of the film edges.

Figure 4:
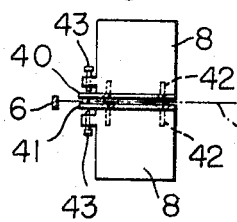
FIG. 4 is a sectional view of one embodiment of a cooling means.

In order to illustrate in further detail the construction of the foregoing cooling means 8, 8 and 8', 8', in FIG. 4 is shown in section one embodiment of the cooling means 8, 8—one of these cooling means.

While the gap of cooling means 8, 8 will vary depending on the thermal properties and thickness of the overlaid films, the degree of coolness of the cooling means, the temperature of the heating means 6, and the distance between the heating means and the film edges, it is preferably of the order of not more than 50 times the over-all thickness of the overlaid films and in a state of light slidable contact with the film edges.

Since it is necessary that the portions of the films other than that to be sealed is completely insulated from the conductive or convectional heat from the heating means, the length of the cooling means 8, 8 should be made longer than that of the heating means.

Further, the cooling means 8, 8 is important in that it intercepts the heat of radiation from the heating means at this part, prevents heat shrinkage of the films and brings the seal line into alignment. It is made of good quality aluminum alloy or steel alloy and that part of it not coming in contact with the films is provided with fins for radiation of heat. Alternatively, if desired, the cooling means 8, 8 may be jacketed and preferably forced cooling be carried out by circulating a cooling liquid therein.

While the gap in the cooling means 8, 8 is provided in one case so that the films are brought into light slidable contact with the gap while passing therebetween, in the other case, the gap is provided so as to allow a little play to the films. The former is conveniently employed when the cooling means is designed for natural cooling, while the latter is suitable when the cooling means is of the forced cooling type.

FIG. 4 shows in section a pair of cooling means 8, 8 disposed facing each other, to which faces are secured bronze plates 40 and 41, respectively, by means of screws 42, 42, the outer side gap between the bronze plates 40, 41 facing each other being adjustable by means of nuts 43, 43 screwed to the cooling means.

Figure 5:
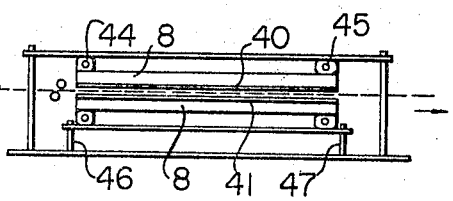
FIG. 5 is a side elevation view of a cooling means similar to that of FIG. 4.
Figure 6:
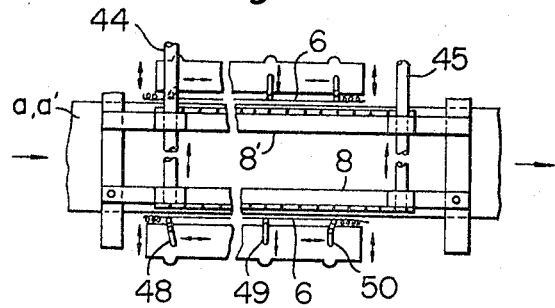
FIG. 6 is a top plan view of the cooling means of FIG. 5.

As shown by a side elevation in FIG. 5 and a top plan view thereof in FIG. 6, whereas one of the pairs of cooling means, i.e. cooling means 8, 8, is secured, the other pair of cooling means 8', 8' is mounted by means of guide bars 44, 45 so as to be capable of lateral movements. Further, the cooling means can be made to be adjustable vertically within certain limits by means of threaded supports 46, 47. FIGS. 5 and 6 illustrate the instance in which ribbonlike nichrome has been used as the heating means 6, the power source being connected to both ends thereof. The reference characters $a$, $a'$ in these drawings indicated the two sheets of films. The device indicated by the numerals 48, 49, 50, which is insulated from the ribbonlike Nichrome 6, 6 by means of insulators, is for adjusting the tension of the ribbonlike Nichrome 6, 6 as well as for adjusting the distance and angle thereof with respect to the cooling means 8, 8.

In the tube-making zone of the invention apparatus, the operation of fusing and sealing the edges of the films is carried out while restraining the shrinkage of the films so that substantially no shrinkage occurs in at least the direction of the seal, i.e., the advancing direction of the films. As specific methods, there are methods such as that in which film delivery spindles capable of braking adjustment is covered with an elastic member of such as rubber and a film is passed between such a delivery roll and a take-up roll, or that in which the film is passed between two sets of drive rolls which act differentially, etc. Preferred however is a method in which the tension of the film in its advancing direction is maintained in a uniform state or that in which a tension regulating device is provided.

Heating means 6, 6' of the tube-making zone of the invention apparatus is disposed in proximity of the film edges protruding externally beyond the aforesaid cooling means 8, 8 and 8', 8', at both sides of the films. It is to be understood that the term "in proximity," as here referred, includes a state of proximity the extent of which is such that said heating means makes slidable contact with said film edges to an extent as does not impede the movement of the films.

Although in FIGS. 5 and 6 was shown the instance in which ribbonlike Nichrome was used as this heating means 6, in FIG. 4 is shown an instance of the use of an oblong blocklike heating means. The use of an oblong blocklike heating means such as this in which has been provided a groove for passing the edges of the films to be sealed is most desirable.

Several embodiments of such groove-equipped heating means will be further described in detail.

Figure 7:
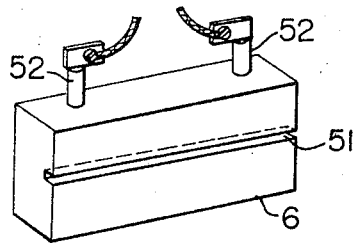
FIG. 7 is a perspective view showing one example of a groove-equipped heating means.
Figure 8:
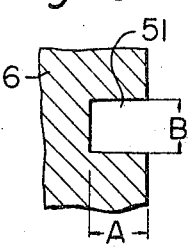
FIGS. 8 and 9 are sectional views showing differing configurations of the groove portion.
Figure 9:
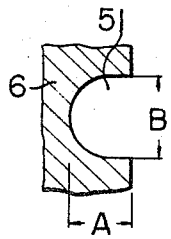

The heating means 6 shown in FIG. 7 is an oblong blocklike heating means provided with a sheathed heater inside and having terminals 52, 52 for the power current for heating and groove 51 through which the film edges pass. Although it is possible to modify the configuration of groove 51, as shown in section in FIGS. 8 and 9, to various shapes such as triangular, elliptic, etc., and further the width B and depth A can be modified, the preferred configuration is rectangular as shown in FIG. 8.

Figure 11:
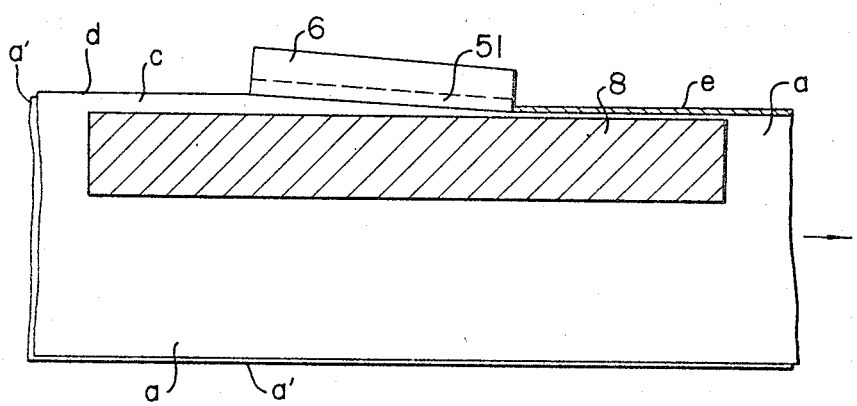
FIG. 11 is a partial top plan view illustrating a preferred arrangement of the heating means disposed so as to be in proximal contact with the films edges to be sealed.

Further, as shown in FIG. 11, heating means 6 is preferably disposed externally of the cooling means 8 close enough so that the film edges C pass through the groove 51 and so that it obliquely contacts the advancing film.

Figure 10:
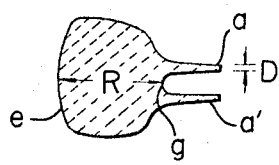
FIG. 10 is a sectional view of the configuration of a sealed portion that is obtained.
Figure 12:
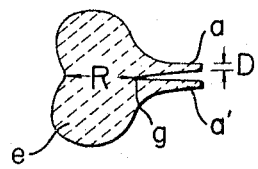
FIG. 12 is a view similar to FIG. 10 of an undesirable form of seal.

Thus, according to the invention apparatus, the sealing of the films at their edges is accomplished without causing any undesirable degradation in the film material itself by a fusion of the films involving their entire thickness thereby to unite the films with the edges in a beaded state. Furthermore, the configuration of the sealed portion section assumes a configuration as shown in FIG. 10, there being no possibility of the sealed portion becoming as in FIG. 12, i.e., with the width R being narrow and an acute V-shaped incision occurring at the point of contact of seal $g$. If a sealed portion such as shown in FIG. 12 is subjected to a stripping force, a seal strength of the order of ⅓ of the tensile strength of the film itself, or at most ½, can only be obtained since the concentration and accumulation of the stress would occur at the incision and because the seal itself is weak since the width R is narrow. On the other hand, when heating means as hereinbefore described are used, the heat-sealing is accomplished with a seal strength of ⅔ or more and with an excellent sealed portion sectional configuration in which local accumulation of stripping stress does not occur. Further, by providing the previously described cooling means in combination with the foregoing heating means it is possible to use thermoplastic films having great heat shrinkage and still accomplish the sealing with the edges of the films beautifully fused together with superior seal strength and without the development of troublesome wrinkles in the vicinity of the sealed portion. With respect to the sectional configuration of the fused sealed portion whose end is beaded, as obtained by the invention apparatus, it is particularly desired that the following two requirements be satisfied, namely:

(i) That there is no V-shaped incision at the contact point of the seal $g$ of the films; and (ii) That the magnitude of the beaded portion has a dimension $R > 10D$.

The surface of the oblong blocklike heating means facing the film to be sealed preferably should have a width of above about 10 times the thickness of one of the films to be sealed and a length of above about 100 times thereof. On the other hand, the film edges $c$ that protrude externally beyond cooling means 8 preferably should have a width ranging between about 100 times to 500 times the thickness of one of the films to be united.

Further, as shown in FIGS. 2 and 3, in the tube-making zone it is preferred to provide another cooling means 7, 7' following the heating means 6, 6', this cooling means 7, 7' being separate from the previously described cooling means 8, 8' and being disposed on the same side as the heating means relatively of the sealed edges at the two sides of the films.

The provision of such a cooling means 7, 7' serves not only to cool rapidly without imparting excessive changes to the configuration of the sealed portion of the films which have been fused together with a desirable sectional configuration by means of the heating means but also enhances the sealing speed without bringing about a decrease in the strength of the sealed portion.

It is possible to employ either a solid cooling means or cold air for this cooling means 7, 7'. In the method in which a solid cooling means is employed, the configuration of the seal is susceptible to deformation, whereas in the method in which cold air is employed, though it has the advantage that it can maintain the sectional configuration of the sealed portion relatively well, on the other hand, its cooling rate is exceedingly low and particularly in the case of biaxially stretched polypropylene film it has the drawback that there is a tendency to the development of distortion during the fusion and sealing operation. Hence, the means in which the cooling is accomplished by rapid cooling with a porous material impregnated with a liquid coolant while preventing the deformation of the sectional configuration of the seal portion is to be preferred. The porous material that can suitably be used include spongy rubber, spongy resins, viscous sponge and fabric structures such as gauze.

An example of such a cooling means 7, 7' and an example of its disposition will be described in further detail with reference to drawings.

Figure 13:
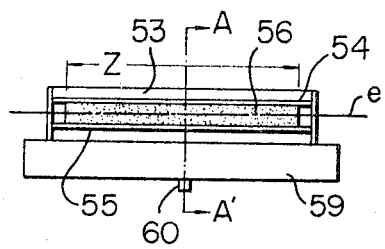
FIG. 13 is a front elevation of a cooling means as seen from the side where it comes in contact with the fused and sealed portion of the films.
Figure 14:
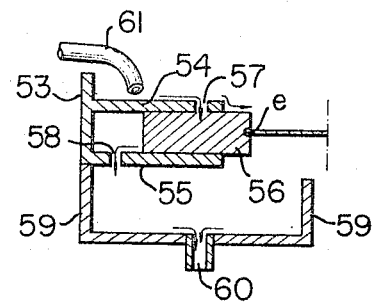
FIG. 14 is an enlarged sectional view taken on line A—A' of FIG. 13.

Cooling means 7 illustrated in FIGS. 13 and 14 is made up of a porous material holder 53 constructed of a 1-mm.-thick sheet iron, a cooling water trough 59 and a porous material 56. In a top plate 54 and a bottom plate 55 of the porous material holder 53 are drilled a suitable number of small holes 57, 58 in parallel with the advancing direction of the films. Now, if a suitable amount of cooling water is fed from hose 61, a part of the cooling water flowing via small holes 57 is absorbed by the porous material 56 and reaches the surface of the porous material 56, while a part of the cooling water flows along over the surface of the porous material 56. This water which flows down over the surface and the excess water which passes out through small holes 58 drip into the trough 59 from whence the water is discharged to the outside via a water discharge outlet 60.

Thus, the sealed portion $e$ whose temperature immediately subsequent to the fusion operation is still high is cooled by being brought into complete contact with the surface of the porous material 56 impregnated constantly with cold water and further is also cooled by the water flowing over the surface of the porous material 56. Hence, the sealed portion is fully cooled in a short period of time, and furthermore objectionable deformations are not imparted the sealed portion by the porous material 56.

The dimensions of the porous material employed will vary depending on the magnitude and temperature of the sealed portion, the sealing speed and the extent of the vibration of the sealed portion. Its design however should be such that it will satisfy the following three conditions:

(a) The thickness must be greater than the range of variation due to the vibration of the films.

(b) Although the length Z will vary depending on the magnitude and temperature of the sealed portion, the sealing speed and the feed condition of the cooling water, the length Z of the porous material should be made the longer as the sealed portion becomes greater, the temperature higher and the sealing speed faster or the feed condition of the cooling water becomes worse.

(c) The width should be greater than that of the sealed portion, considering the deformation of the porous material.

Figure 15:
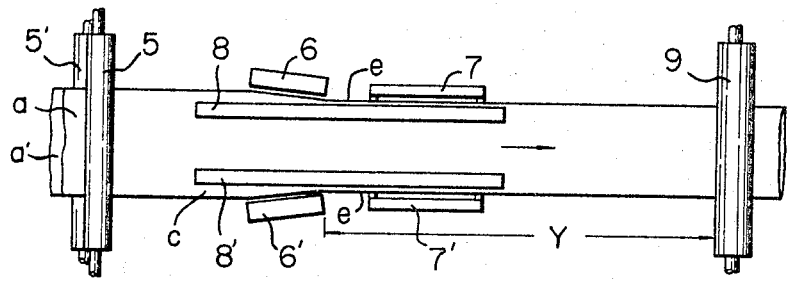
FIG. 15 is a top plan view of one example in which a cooling means has been provided in the tube-making zone.
Figure 16:
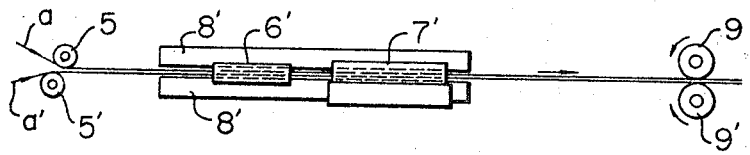
FIG. 16 is a side view of the cooling means of FIG. 15.

Referring to FIG. 15, when heating means 6, 6' is brought close to the film edges, the film edges start to fuse by means of the convectional heat from heating means 6, 6', from the remote edges of the film edges C which have come close to the heating means. The fusion of the film edges continue while maintaining a small clearance between the film edges and the heating means until the fusion is stopped by the edges of cooling means 8, 8'.

The width of the fusion of the films is defined by the distance between the remote edges of the foregoing film edges C and the edge of the cooling means. The fused and united sealed portion $e$ must be cooled during its travel through the cooling distance Y between the rear end of the heating means and the take-up rolls 9, 9'. The cooling time is determined by the cooling distance Y and the film speed.

It is to be understood that according to this invention when, for example, a single sheet of film is folded over along its advancing direction to make a tubular body, the necessary modification in design of the invention apparatus can be made accordingly for fusion sealing the film edges which open to one side only.

Further, following the end-fusion tube-making means, as hereinbefore described, whereby the edges of films at their two sides are completely fused together at their edges with ends in a beaded state, the invention apparatus has a severing means and a bag bottom sealing means for fusing together one of the severed edges of the severed tubular structure. It is, of course, obvious that a suitable conveying means may be provided, as required, between the severing means and the bag bottom sealing means.

FIGS. 1–3 illustrate an apparatus having following the tube-making means a severing means and a bag bottom sealing means and interposed between the two latter means an accelerating stacker and a direction-changing stacker.

Illustrated in these drawing is an apparatus having the foregoing severing means consisting of a rotary cutter 10 and a pair of nip rollers 11, 11' rotating at a faster speed than the aforementioned take-up rolls 9, 9', then an accelerating stacker consisting of a pair of idling rolls 13, 13', a pair of pressing rolls 14, 14' and a pair of driving rolls 15, 15', on which are mounted a plurality of sets of facing pairs of belts 12, 12', whereby the foregoing severed film tubes are clasped between the groups of belts and conveyed, a direction-changing stacker for grasping the film tubes conveyed by the above accelerating stacker and conveying them in a direction at right angles to the original direction of travel of the film tubes, followed by a bag bottom sealing means having a heating means 31 so disposed as to contact the one of the severed edges of the severed film tubes for fusing together said edges while said film tubes are being conveyed by being grasped between a plurality of sets of belts 28, 28', 29, 29', 30, 30'.

The severing means, the conveying stackers and the bag bottom sealing means will be described in further detail, reference being had to the same drawings, FIGS. 1–3.

FIGS. 1 and 2 illustrate an embodiment in which a film rectifying zone consisting of a plurality of rolls has been set up between the guide roll 5 (although in these drawings only one is used, a plurality may be used e.g. as shown in FIG. 15) for delivering a plurality of films (these drawings show the instance where two films are used) and the spindles 1, 1' upon which are mounted the rolls of films from which the films are unwound.

In this film rectification zone, by contacting the films with heated rolls prior to their being fed to the tube-making means, and preferably by imparting a tension to the films not exceeding their elastic limit at a temperature ranging between the heat stress developing temperature of said films and a temperature 60° higher the development of objectionable slacks in one of the films owing to slight differences in flatness or tension between the two films unwound from the spindles 1, 1' is prevented.

In the drawings, 1, 1' are the spindles upon which the roll of films $a$, $a'$ are mounted. 2, 2' are the guide rolls, 3, 3', the heating rolls, 4, 4', the cooling rolls and 5, the guide roll. The two films $a$, $a'$ of the same width which are unwound from the rolls are imparted a suitable tension by a brake (not shown) fitted to the rewinding spindle 1, 1' thereby eliminating any wrinkles or slackness from the films and by being cooled by the cooling rolls 4, 4' are rectified to provide flat films that are without any tension irregularities. This film rectifying part is constituted of heating rolls having surfaces which are smooth and flat.

The two rectified films which are overlaid by the guide roll 5 and then taken up by take-up rolls 9, 9' with their edges protruding from between the two pairs of cooling means 8, 8 and 8', 8' for a distance that the end-fusion sealing is to be performed are end-fusion sealed during this interim to become a film tube.

The film tube which by thus passing through the tube-making means has had its edges completely fused together is then conveyed to the severing means having a rotary cutter 10 and nip rollers 11, 11'. Namely, the film tube is fed to nip rollers 11, 11' which rotate at a slightly higher speed than the take-up rolls 9, 9' to be cut under tension into predetermined lengths by means of a conventional rotary cutter 10.

Since in the apparatus shown in FIGS. 1–3 the next following bag bottom sealing means is provided at right angles to the tube-making and severing means, a conveying means consisting of an accelerating stacker and a direction-changing stacker is interposed between the tube-making and severing means and the bag bottom sealing means.

The accelerating stacker consists of a plurality of sets of facing pairs of belts 12, 12' mounted on a pair of idling rolls 13, 13', a pair of pressing rolls 14, 14' and a pair of driving rolls 15, 15'. The idling rolls, in this case, are capable of either drawing near to each other or departing from each other, and hence make it possible for the gang of belts 12, 12 . . . and gang of belts 12', 12' . . . to open and close with the pressing rolls 14, 14' as pivots. The driving rolls 15, 15' similarly makes possible the opening and closing of the gang of belts 61, 61 . . . and gang of belts 61', 61' . . . Thus the film tube cut by the severing means is grasped between these groups of belts and conveyed to the next operation.

The accelerating stacker consists of a plurality of facing pairs of belts 12, 12', pairs of idling rolls 13, 13 making opening and closing movements and driving rolls 15, 15' and its serves to receive the severed film tubes and providing a suitable space between them delivers them to the next following direction-changing stacker. For this purpose, the rotating speed of the gang of belts 12, 12' is made faster than the take-up rolls 9, 9' and the idling rolls 13, 13' and driving rolls 15, 15' are opened and closed by means of a cam mechanism. Namely, when the severed film tube is being delivered from the nip rolls 11, 11', the idling rolls 13, 13' stay open, but as soon as the severed film tube is released from the nip rolls 11, 11', the idling rolls 13, 13 immediately close and the film tube of film being clasped between the gang of belts 12, 12' is conveyed. Pressing rolls 14, 14' are preferably provided so as to be capable of being shifted to permit the adjustment of their distance to the idling rolls 13, 13' in accordance with the length of said film tubes. The gap between the rolls 14, 14' are also preferably adjustable. The opening and closing of the driving rolls 15, 15' is linked with the opening and closing of the direction-changing stacker to be described next.

The direction-changing stacker is constituted of a plurality (e.g., three in the drawing) of pairs of gripping rolls 19, 19', 20, 20', 21, 21' which make opening and closing movements, metallic belts 18, 18' and fabric belts 16, 16' and 17, 17' rotating with the foregoing rolls, film tube guide plates 22, 22, 22', 22', a collision plate 23 and belt driving rolls 24, 24, and its object lies in changing the direction of the travel of the film tube in a direction at right angles to that in which was being conveyed by the aforesaid accelerating stacker, the change in direction being made for sealing the bottom of the film tube.

In FIGS. 1–3, during the interim that the film tube, which has been ejected from the driving rolls 15, 15', passes between the guide plates 22, 22, 22', 22', and up to the instant its tip hits the stop plate 23, the rolls 15, 15' remain closed and the belts 16, 16', 17, 17', 18, 18' of the direction-changing stacker remain opened. Upon collision of the tip of the tubular structure with stop plate 23, the driving rolls 15, 15' open to release the grip on the film tube, while simultaneously the gripping rolls 19, 19', 20, 20', 21, 21' close thereby clasping the film tube with the metallic belts 18, 18' and the fabric belts 16, 16', 17, 17' and then deliver the film tube to the hereinafter described bag bottom sealing means. The film width to be fused can be adjusted as desired by varying the distance between the stop plate 23 and the gripping rolls 21, 21', the rolls nearest to the stop plate 23.

The film tube delivered from the direction-changing stacker is conveyed to the bag bottom sealing means. The edge to be fused of the film tube is its severed end which protrudes beyond the metallic belts 30, 30' while being clasped thereby (the width to be fused being adjustable by means of the positioning of the stop plate 23).

The bag bottom sealing means is constituted of the foregoing pair of metallic belts 30, 30', which rotate while clasping the severed film tube with the end thereof to be fused protruding beyond the belts, a plurality (the drawings illustrate the case of two) of pairs of fabric belts 28, 28', 29, 29' and wheels 25, 25', 26, 26', 27, 27' and driving wheels 33, 33', 34, 34', 35, 35' upon which these belts are mounted, and pressing rolls 36, 36', 37, 37' 38, 38' for adjusting the clearance between the facing belts 28, 28'–30, 30'.

It is to be understood that, needless to say, the number of belts or number of rollers employed in the previously described conveying stackers and the foregoing bag bottom sealing device are capable of modification as desired.

The film tube delivered from the direction-changing stacker, in advancing while being clasped between the foregoing belts 28, 28', 29, 29', 30, 30', passes by a heating means 31 disposed contiguous to the metallic belts 30, 30' where its end protruding beyond the metallic belts 30, 30' is fused together by being heated by said heating means 31, followed by cooling of the sealed portion by means of a cooling means 32 disposed following said heating means. As this cooling means, conveniently employable is one which is similar in construction to the previously described cooling means 7. Thus, a bag sealed at its three sides is made. Though not shown in the drawings, since the temperature of the metallic belts 30, 30' rise as a result of the convectional heat from the heating means and the conductive heat from the sealed portion, it is particularly desirable that cooling means for the metallic belts be provided for preventing this rise in temperature. This cooling means may be one in which cold air is used or a method can be used in which a cooled metallic body is brought into contact with the belts.

The present invention is not limited to the embodiments illustrated but is capable of various changes and modifications within the spirit of the invention and scope of the appended claims.

For instance, the arrangement may be such that after having made the film tube in a direction proceeding upwardly, the direction in which the film tube travels may be reversed to proceed downwardly, after which the accelerated severed film tubes are delivered to the direction-changing stacker, or the arrangementt may be one in which after making the film tube, that part of the apparatus for carrying out the severence and acceleration is inclined and the direction-changing stacker and bottom sealing part being disposed at right angles to the accelerating stacker.

Further, while an illustration was given of the instance in which roll films of identical widths were used in making the bags, it is also possible to use roll films having different widths by disposing a slitting means between the spindles 1, 1' and the heating means 6, 6', for slitting the films into identical widths.

Figure 17:
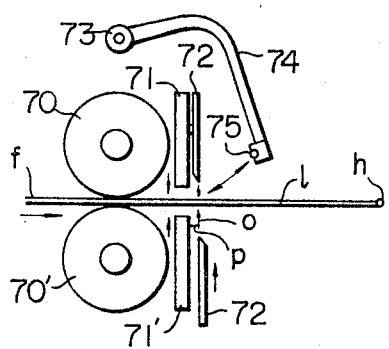
FIGS. 17 and 18 are schematic side elevation views of a severing and bag bottom sealing means forming a part of the apparatus of the present invention.
Figure 18:
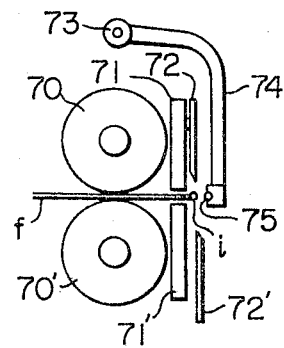

Further, the severing and bag bottom sealing means in the invention apparatus can be constituted as shown in FIGS. 17 and 18. The setup in this case includes a pair of driving rolls 70, 70' for delivering the thermoplastic synthetic resin film tube $f$, a pair of presser plates 71, 71' for clasping said film tube when the movement of said tube stops upon reaching a predetermined distance, a pair of severing blades 72, 72' disposed apart from said presser plates, which clasp the edge of the film tube, in the direction of the delivery of the tube a distance equal to the width of the tube edge to be fused, and an arm 74 having a heating means 75 at its distal end which is so attached to a rotating shift 73 externally of said presser plates and severing blades as to be capable of approaching the position at which the heating and fusion of the edge of the film tube is carried out.

FIG. 17 illustrates the state in which the film tube is being delivered forth after having had its bag bottom sealed. On the other hand, FIG. 18 shows the state in which the bottom is being fused and sealed.

In FIG. 17, 70 and 70' are the driving rolls for delivering forth the film tube f and it delivers a bag l of predetermined length having a bottom seal h. When the driving rolls cease their movement, the presser plates 71, 71' of metal approach each other and clasp the film tube. Next, the bottom blade 72' rises and by means of its severing action in cooperation with the upper blade 72 secured to presser plate 71 severe the film tube f at point o. The severed film tube protrudes beyond the edges of the presser plates a distance P.

As soon as the severance of the film tube is completed, the heating means 75 attached to the arm 74 which rotates with the rotating shaft 73 as a pivot approaches the edges of the film tube protruding beyond the presser plates 71, 71' and fuses together the film edge by means of its convectional heat to form an end-fused sealed portion i. After a given time, the heating means 75 departs from the fused portion i and reverts to its former position.

Presser plates 71, 71' continue their application of pressure for some time after the heating means has departed from the fused portion i and permits the latter to cool. Thereafter, the foregoing operations are repeated.

The movements of the driving rolls 70, 70', the presser plates 71, 71', the severing blades 72, 72' and the heating means, as described above, can be readily put to practice by using the conventional cam mechanisms.

The time involved for carrying out each of these steps of the severing and bag bottom sealing operations is, for example, ¼ cycle for the delivery of the film tube, ¼ cycle for severing the film tube, and ⅙ and ⅓ cycles for accomplishing the fusion and cooling operations, respectively, while the film tube is being pressed by the pressure plates.

Of greatest importance when sealing the bottom of a high shrinkage (stretched) thermoplastic film tube by a heat-fused seal is that this bottom sealing be accomplished uniformly. As the sealed portion along the sides have already been fused once, their behavior during the time the bottom is to be sealed differs from that of the stretched film portion. Namely, the sealed portion at the sides has a heat shrinkage less than the original film and because it is beaded its fusion is slower than that of the film portion and hence to obtain a uniform bead at the corner portions is difficult. In order to obtain a uniform bottom seal, it is necessary to bring the heating means in contact with the sealed portions at the sides and fuse it and in accordance with the state of fusion of the side sealed portions to narrow successively the gap between the heating and cooling means. Therefore, the bag bottom sealing means described with reference to FIG. 1–3 is preferred.

What is claimed is:

1. An apparatus for making tubes for conversion into bag-like bodies of highly heat shrinkable thermoplastic synthetic resin films, said apparatus comprising at least one guide roll, take-up rolls spaced from the guide roll, a pair of cooling means disposed between the guide roll and the take-up rolls along a plane in which two sheets of film are advanced between the rolls, said pair of cooling means being positioned just slightly inwardly of the location of the side edges of the films to be sealed, said cooling means having a gap through which the films are slidable, heating means disposed on both sides of the path of the films adjacent the film edges and along which the film edges protruding externally of said cooling means are adapted to slide, said heating means being disposed at an angle with respect to the adjacent direction of the films and in the plane of the films with the end toward the guide roll farthest away from the edge of the film, a further cooling means disposed next following each said heating means in the direction in which the films move and against which the film edges are adapted to slide.

2. An apparatus according to claim 1 in which said heating means has a groove for the passage of the film edges and further is disposed at an angle with respect to the advancing direction of the films and in the plane of the films with the end toward the guide roll further away from the edge of the film so as to ensure that said film edges travel through said grooves.

3. An apparatus according to claim 1 in which said further cooling means is a porous material impregnated with a liquid coolant.

References Cited

UNITED STATES PATENTS

| 3,106,502 | 10/1963 | Starger et al. | 156—251 |
| 3,257,256 | 6/1966 | Lehmacher et al. | 156—495 |
| 3,272,674 | 9/1966 | Sachs et al. | 156—282 |
| 3,304,217 | 2/1967 | Mommsen et al. | 156—499 |

EARL M. BERGERT, *Primary Examiner.*

M. L. KATZ, *Assistant Examiner.*

U.S. Cl. X.R.

156—499, 515, 583

PO-1050
(5/69)

UNITED STATES PATENT OFFICE
CERTIFICATE OF CORRECTION

Patent No. 3,449,196            Dated June 10, 1969

Inventor(s) YUTAKA MORITA, YOSHINOBU SHIBATA and SHUNICHIRO KIRIMURA

It is certified that error appears in the above-identified patent and that said Letters Patent are hereby corrected as shown below:

The listing of the names of the inventors at the heading of Column 1 of the specification should read as follows:

YUTAKA MORITA, YOSHINOBU SHIBATA and SHUNICHIRO KIRIMURA Mishima-shi, Shizuoka-ken, Japan, Sunto-gun, Shizuoka-ken, Japan and Mishima-shi, Shizuoka-ken, Japan, assignors to Toyo Rayon Kabushiki Kaisha, Tokyo, Japan At the top of each sheet of drawings change HIROSUKE YUMOTO ET AL to YUTAKA MORITA ET AL

SIGNED AND SEALED
APR 21 1970

(SEAL)
Attest:

Edward M. Fletcher, Jr.
Attesting Officer

WILLIAM E. SCHUYLER, JR.
Commissioner of Patents